(12) United States Patent
Wetzel

(10) Patent No.: US 8,422,716 B2
(45) Date of Patent: Apr. 16, 2013

(54) DUAL LOCKING BOOM POLE

(76) Inventor: Donald E. Wetzel, Whitefisth, MT (US)

( * ) Notice: Subject to any disclaimer, the term of this patent is extended or adjusted under 35 U.S.C. 154(b) by 1582 days.

(21) Appl. No.: 11/786,982

(22) Filed: Apr. 13, 2007

(65) Prior Publication Data

US 2008/0253600 A1    Oct. 16, 2008

(51) Int. Cl.
*H04R 9/08*    (2006.01)

(52) U.S. Cl.
USPC ..... 381/362; 381/363; 403/109.4; 403/109.5; 248/337; 248/412; 285/302

(58) Field of Classification Search .......... 381/361–363; 174/69; 248/337, 412; 285/302; 403/109.4–109.5
See application file for complete search history.

(56) References Cited

U.S. PATENT DOCUMENTS

| | | | | |
|---|---|---|---|---|
| 1,887,637 A | * | 11/1932 | Hansen | 381/362 |
| 1,942,925 A | * | 1/1934 | Jenkins | 248/123.2 |
| 1,970,624 A | * | 8/1934 | Recker | 248/412 |
| 2,184,358 A | * | 12/1939 | Moore | 285/302 |
| 4,277,197 A | * | 7/1981 | Bingham | 403/104 |
| 6,594,371 B2 | * | 7/2003 | Wetzel et al. | 381/362 |
| 7,637,684 B2 | * | 12/2009 | Tims et al. | 403/109.5 |

* cited by examiner

*Primary Examiner* — Curtiz Kuntz
*Assistant Examiner* — Ryan Robinson
(74) *Attorney, Agent, or Firm* — Marcia Devon

(57) ABSTRACT

A telescoping boom pole for an electrical conductor is disclosed. The boom pole includes at least a top cylindrical conduit slidably assembled within a second cylindrical conduit. A top clamping means is included for selectively clamping the top conduit to the second conduit. The top clamping means includes an annular cylindrical collar having a threaded portion proximate a bottom edge on an inside surface thereof, and a collet restraining means proximate a top edge thereof. An annular, compressible collet is resiliently captured by the collet restraining means of the collar at a cooperative restraining means of an outside surface of the collet. The collet further includes an inclined lower portion on an outside surface thereof. The top clamping means further includes an annular sleeve fixed to a top end of the second conduit, and has an outside surface that includes a threaded portion that cooperates with the threaded portion of the collar. A top edge of the sleeve is formed into an upwardly-projecting wedge for pushing the collet inwardly at its inclined lower portion as the collar is threaded onto the sleeve. As such, the collet, the sleeve, and the collar force the top and second conduits to become mutually and immovably fixed together. Additional cylindrical conduits may be included and successively slidably assembled over the second conduit, additional clamping means being included between each conduit. As such, the conductor and electrical connectors thereof may be positioned through each conduit and each clamping means and be supported thereby.

16 Claims, 8 Drawing Sheets

DUAL LOCKING BOOM POLE

STATEMENT REGARDING FEDERALLY SPONSORED RESEARCH AND DEVELOPMENT

Not Applicable.

FIELD OF THE INVENTION

This invention relates to telescoping supports, and more particularly to a telescoping microphone support boom.

DISCUSSION OF RELATED ART

Microphones assemblies used in the film and broadcasting industries are typically mounted on a boom pole. The quality of reception for most microphones is dependent on the direction of the microphone and the distance the microphone is from the speaker. Consequently, recording speech requires that the microphone be positioned as close to the speaker as possible and in the proper orientation. The microphone, the boom pole and its operator must be located out of the view of the camera.

It is also desirable to have a microphone boom pole which is collapsible so that it can be easily transportable. Therefore, boom poles are often formed of telescoping sections of diminishing diameters which may be retracted to the length of a single section. When the boom poles are expanded to their desired length, it is necessary to be able to lock the pole into position at the selected length. Presently available boom poles utilize tightening collets at each section. One of the problems encountered with the presently available poles is that the poles flex with the weight of the microphone and microphone assembly because the poles are clamped at a single point at the collets. It is an object of the present invention to provide a microphone boom pole which will not bend and will withstand a substantial amount of torque.

Another problem encountered with the existing collets is that the size difference between each section and the inadequate clamping causes noise when the connection between the sections wobble which is then transmitted to the microphone. The present invention eliminates wobbling between the sections in the extended position because the clamping renders the sections immovable.

Another difficulty with conventional designs is that the transmitter used with the microphone boom pole assemblies is that when the pole is accidentally dropped, it is dropped on the transmitter, often damaging the transmitter. It is an object of the present invention to design a boom pole which minimizes any damage caused by dropping the transmitter and particularly will prevent transmitter damage.

Yet another difficulty encountered with conventional designs is that the microphone cable is often tangled with other equipment. It is a further object of the present invention to provide a feature which will secure the microphone cable in a desired location. The present invention accomplishes these objectives.

SUMMARY OF THE INVENTION

The present invention is a telescoping support pole, commonly referred to as a boom pole, which is hollow for enclosing an electrical conductor. In the preferred embodiment, the electrical conductor is a microphone cable. The boom pole includes at least a first cylindrical conduit section and a second cylindrical conduit section and usually includes multiple sections. The second section of the pole is slidably assembled over the first section and each successive section is slideably assembled over the previous section.

A clamping mechanism is provided to join each section to the neighboring section of the pole. A first clamping mechanism is provided for selectively clamping the first section of the pole in a desired location relative to the second section of the pole and for each successive section. The first clamping mechanism includes: (1) an annular cylindrical collar having a threaded portion on an inside surface of the collar and a means for restraining a collet (e.g. a channel); (2) an annular, discontinuous collet which is formed with a lip for insertion into the channel of the collar; and (3) an annular sleeve affixed to the upper end of the second conduit. The annular collet is compressible and is resiliently captured by the collet restraining means of the collar at a lip formed on the outside surface of the collet. The collet further includes an inclined lower portion on an outside surface of the collet. The first clamping means further includes an annular sleeve affixed to a top end of the second conduit, and has an outside surface including a threaded portion which mates with the threaded portion of the collar. The top edge of the sleeve is formed into an upwardly-projecting wedge for pushing the collet inwardly at its inclined lower portion as the collar is threaded onto the sleeve. When the threads of collar are tightened on the threads of sleeve, the wedge is pressed inwardly on the collet's inclined lower portion forming a lip. Tightening the threads causes the collet, the sleeve, and the collar to be compressed and with the lip of the collet inserted into the channel of the collar, each conduit section is locked in the desired position.

Additional cylindrical conduits may be included and successively slidably assembled over each other with additional clamping means being provided between each conduit. The cable is inserted through all of the conduit sections clamping mechanisms.

A retaining clip placed on the outside of the pole may be included for selectively retaining the cable on the outside surface of one of the cylindrical conduit sections. Further, a base support having an elastomeric or pliable bumper may be included in the lower-most conduit section, the tail section, for securely supporting a wireless transmitter and for reducing noise or vibration through the support when the lowermost additional conduit is impacted inadvertently into the ground or other surface. The base support is preferably attached to the tail section with the end piece clamping means, and may include an XRL-type connector electrically connected to the conductor for allowing the transmitter to be quickly, electrically connected thereto. Preferably, a top end of the top conduit includes an additional end piece clamping means and a mounting plug. The mounting plug is received in the top end of the first conduit section and is selectively fixed to the first section by the additional clamping means. The mounting plug further includes a mounting means, such as a conventional camera mounting bolt, and a conductor slot therein for receiving the cable or electrical conductor.

An end piece clamping mechanism is provided, which is a modification of the first clamping mechanism to serve the function of securing the microphone mount and the base support to the top end and tail end of the pole, respectively.

The present invention provides a microphone boom support that is telescopically adjustable and does not flex or wobble when in an extended orientation as with conventional boom poles The present invention is designed to handle a substantial load, orders of magnitude greater than is known to be used in the industry, without bending or breaking. The present invention does not transmit any noise to the microphone even after the parts wear with substantial use. Further, the present invention provides for a cushioned wireless transmitter support at a lower end of the boom support, and further provides means for maintaining the electrical conductor of the microphone in an untangled and compact manner. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
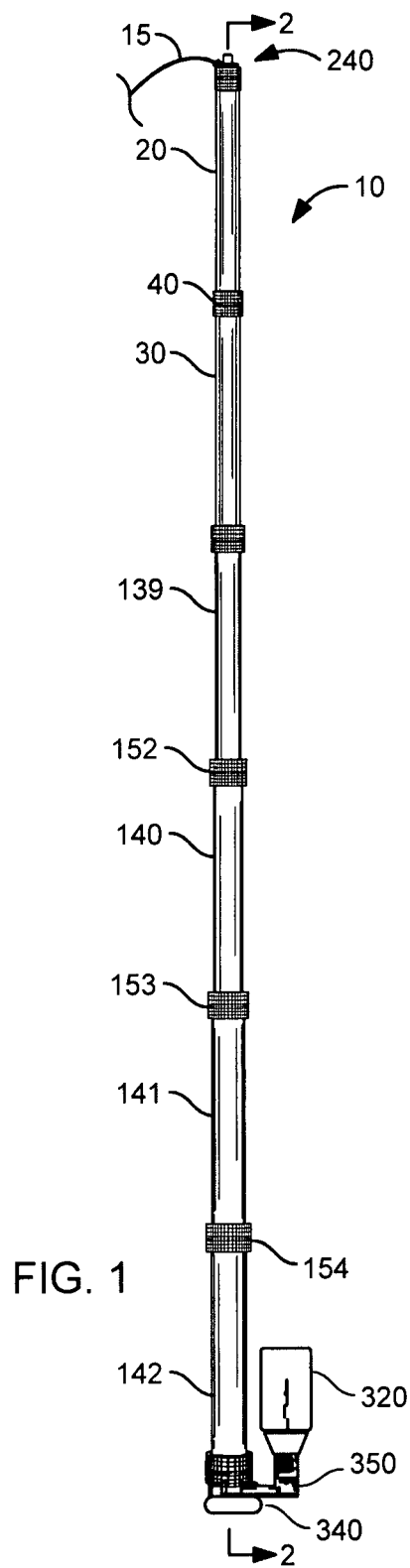
FIG. 1 is a front elevational view of the invention, illustrating a telescoping support in an extended orientation.
Figure 16:
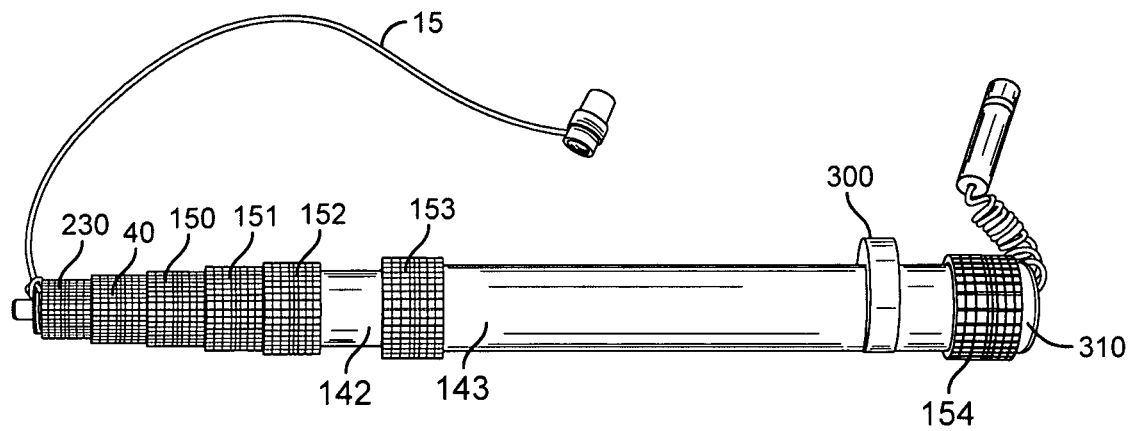
FIG. 16 is a front elevational view of the invention, illustrating the telescoping support in the collapsed orientation.

The telescoping boom pole 10, shown in its extended position, is illustrated in FIG. 1. FIG. 16 illustrates the pole in its collapsed orientation, suitable for transport or storage. The conductor 15 is placed inside and through the hollow boom pole as shown in FIG. 16. The conductor 15 is an electrical conductor 15, and is typically a cable having a number of wires therein for electrically connecting various electronic components which are part of a microphone assembly (not shown). The boom pole may also be used with devices other than a microphone e.g. a video camera.

Figure 3:
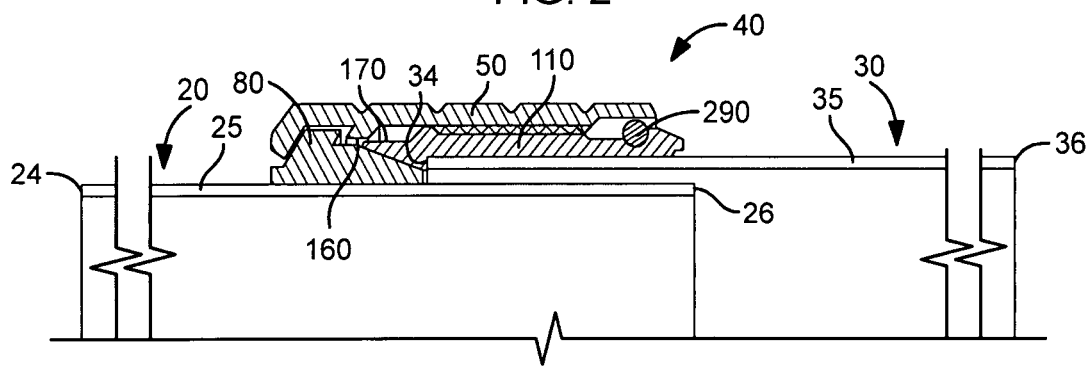
FIG. 3 is a partial cross-sectional view of the invention, taken generally along lines 3-3 of FIG. 2, illustrate a clamping means between two conduits of the invention.

The boom pole 10 includes multiple cylindrical conduit sections 150, 151, 152, 153, and 154, and is generally made from a rigid metallic material, preferably high density carbon graphite. In the preferred embodiment, PTFE virgin electrical grade teflon with high density carbon fiber is utilized which provides strength and enlarged lubricity. FIG. 3 illustrates a first cylindrical conduit section 20 which has an outer wall 25, a first open end 24, and a bottom open end 26. A second cylindrical conduit section 30 is provided which has an outer wall 35, a top open end 34, and a bottom open end 36. The second section 30 is slidably assembled over the first section 20.

Figure 4:
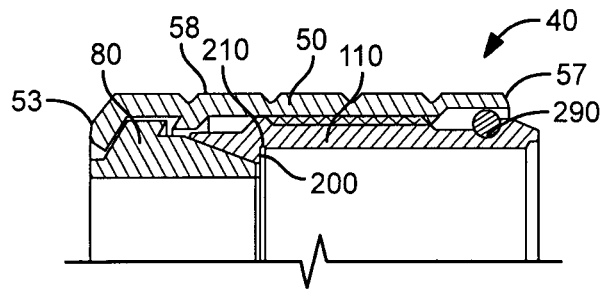
FIG. 4 is an enlarged partial cross-sectional view of the invention, taken generally along lines 3-3 of FIG. 2.
Figure 5:
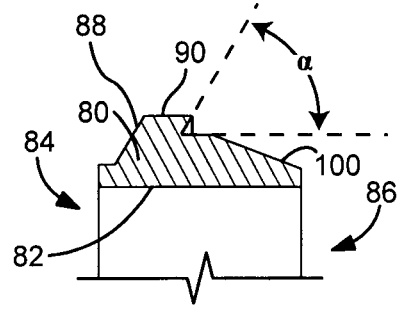
FIG. 5 is a partial cross-sectional view of a collet of the clamping means.
Figure 7:
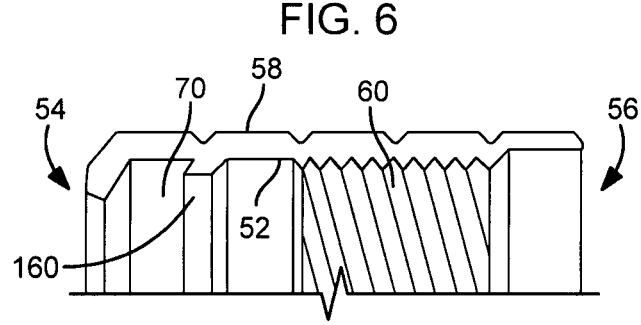
FIG. 7 is a partial cross-sectional view of a collar of the clamping means.
Figure 13:
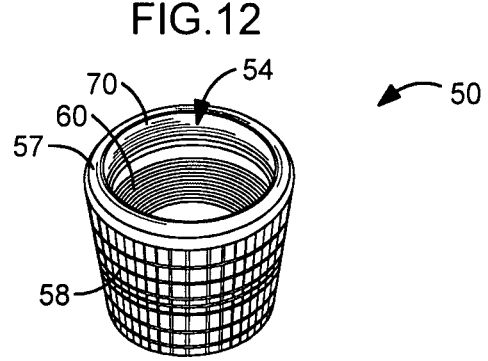
FIG. 13 is a perspective view of the collar of the clamping means.

Two different clamping mechanisms are provided: (1) for securing each of the middle sections to each other and (2) for securing other hardware to the top section and the bottom section. The middle sections of the pole are secured to each other by a first clamping mechanism 40 (FIG. 2 and FIG. 3) for selectively securing the first section 20 at the desired location relative to second section 30. The first clamping mechanism 40 includes an annular cylindrical collar 50 (FIGS. 4, 7 and 13). The collar 50 has a first open end 54, a second open end 56 (FIG. 7), a generally cylindrical inside surface 52 (FIG. 7), a generally cylindrical outside surface 58, and top and bottom edges 53 and 57 (FIG. 4) respectively. The inside surface 52 includes a threaded portion 60 proximate the bottom edge 56 and a collar restraining means 70 proximate to the top edge 54 to receive the collet 80.

Figure 11:
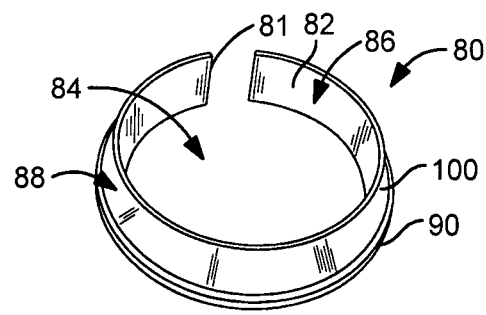
FIG. 11 is a perspective view of the collet of the clamping means.

The first clamping mechanism 40 further includes an annular, compressible collet 80, illustrated in FIG. 11, which has a top open end 84, a bottom open end 86, a generally cylindrical inside surface 82, and an outside surface 88. The collet 80 is resiliently captured, at its outside surface 88, by the collar restraining means or channel 70 formed within the inside surface of the collar 50. The collet 80 is formed with an inclined lower portion 100 on the outside surface of the collet terminating in a lip 90. The lip 90 of the collet is received by the channel 70 to secure the collet in place within the collar. The collet 80 is open at 81 to permit the collet 80 to be compressed when threaded collar 50 is tightened.

Figure 6:
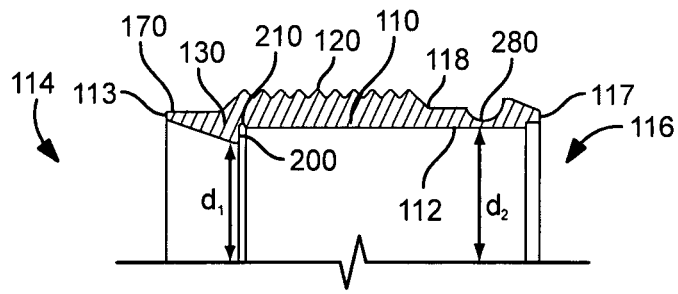
FIG. 6 is a partial cross-sectional view of a sleeve of the clamping means.

The first clamping mechanism 40 further includes an annular sleeve 110, as shown in FIGS. 4 and 6, which is provided on each of the conduit sections. The sleeve 110 has a top open end 114, a bottom open end 116, a generally cylindrical inside surface 112, a generally cylindrical outside surface 118, a top edge 113, and a bottom edge 117. The sleeve 110 is fixed to the upper end 34 of the second section 30. The outside surface 118 of the sleeve 110 includes a threaded portion 120 (FIG. 6) which is received by the threaded portion 60 of the collar 50. The top edge 113 of the sleeve 110 is formed into an upwardly-projecting wedge 130. When the threads of collar 50 are tightened on the threads of sleeve 110, the wedge 130 is pressed inwardly on the collet's inclined lower portion 100. Tightening the threads causes the collet 80, the sleeve 110 and the collar 50 to be compressed with the lip of the collet inserted into the channel of the collar thereby which locks each conduit section. 20 and 30 in position.

The user first slides the conduit sections to the desired location relative to each other. The collar 50 is then tightened, engaging the threads, causing the collet 80, the sleeve 110, and the collar 50 to be squeezed together with the lip 90 of the collet inserted into the channel (collet restraining means) 70 of the collar which securely lock each of the conduit sections in place.

Figure 2:
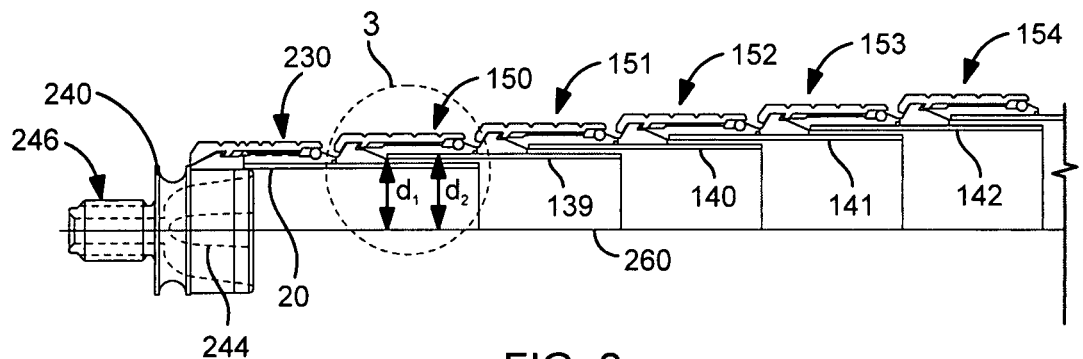
FIG. 2 is a partial cross-sectional view of the invention, taken generally along lines 2-2 of FIG. 1, illustrating the telescoping support in a collapsed orientation.

Additional cylindrical conduits 140, 141, and 142 are typically included and are successively slidably assembled over the second conduit 30. Additional clamping mechanisms 150, 151, 152, 153 and 154 are included between each conduit 140 (FIGS. 1, 2, and 16). The pole, with all of its sections fixed into position, encloses the cable 15 which is positioned through each conduit section 20, 30, and 140.

In a preferred embodiment of the invention, the inside surface 52 of annular collar 50 of the clamping mechanism further includes an annular rim 160 on the channel 70 as shown in FIG. 7. The rim 160 retains the wedge 130 against the collet 80 when the clamping means is in the open position as illustrated in FIG. 3.

Further in the preferred embodiment, the collet 80 includes a lip 90 protruding from the outside surface 88 of the collet (FIGS. 3, 4, and 7). The lip 90 engages the channel 70, and as the collet 80 is compressed, the lip 90 retracts from the channel 70. The angle α is formed by the lip 90 and the channel 70 with respect to the longitudinal axis 260 of each of the conduits sections 30, 40, and 140. Angle α is critical for proper operation of the clamping mechanism 40 and 150, and should be between 20° and 25°, but is preferably 22.5°.

The sleeve is preferably adhered to each conduit section in manufacturing. In the preferred embodiment, the adhesive is an epoxy designed for thermal expansion. The conduit section 30 is placed inside the sleeve 110. The inside surface 112 of the sleeve 110 preferably forms a lip 200 proximate the top edge 113 of the sleeve (FIG. 6), such that the top open end 114 has a smaller diameter $d_1$, than a diameter $d_2$ of the bottom open end 116. The top end 34 (FIG. 2) of the second conduit section 30 abuts the lip 200 when the sleeve 110 is affixed to the top end 34 of the second section 30 (FIG. 3). Further, the inside surface 112 of the sleeve 110 may include a channel 210 for accepting an adhesive (not shown) to adhesively fix the sleeve 110 to the second section 30 (FIG. 6). Moreover, an O-ring retention channel 280 is preferably formed into the outside surface 118 of the sleeve 110 proximate the bottom edge 116 thereof, such that an elastomeric O-ring 290 may be retained therein, as shown in FIGS. 3 and 4. The O-ring 290 provides protection from the of grime and debris in the collars.

Figure 14:
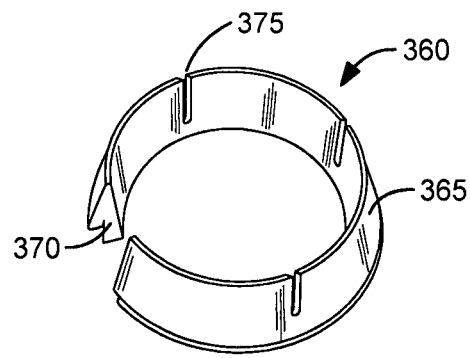
FIG. 14 is an alternate perspective view of the collet of the clamping means.
Figure 19:
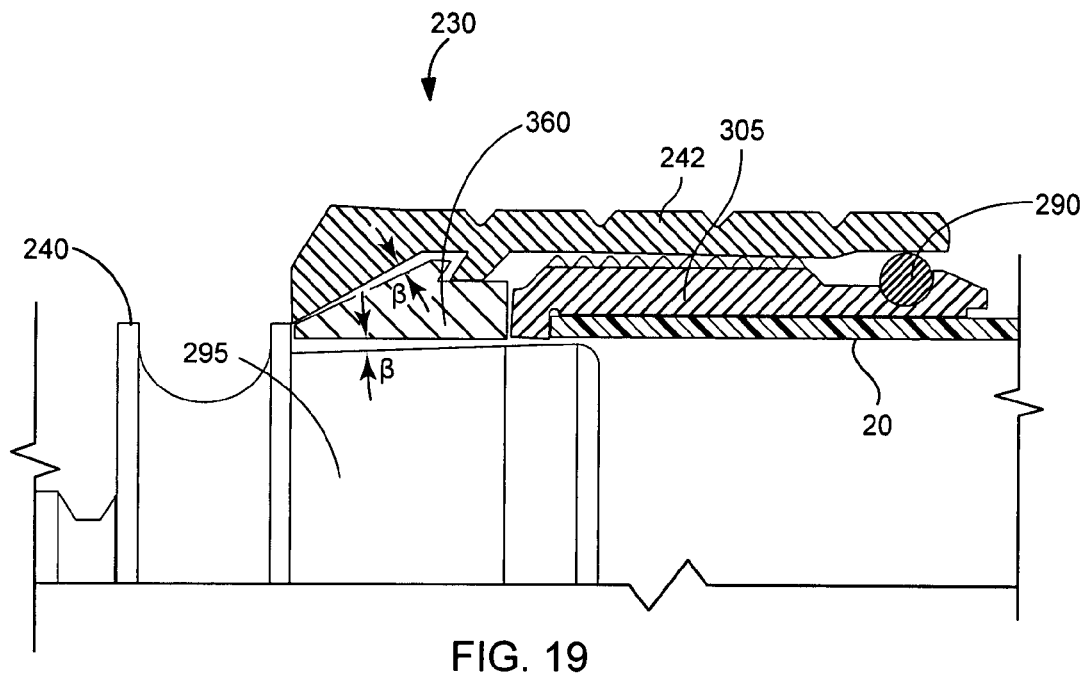
FIG. 19 is a partial cross-sectional view of a microphone mount, the first conduit section and the end piece clamping means in its open position.
Figure 20:
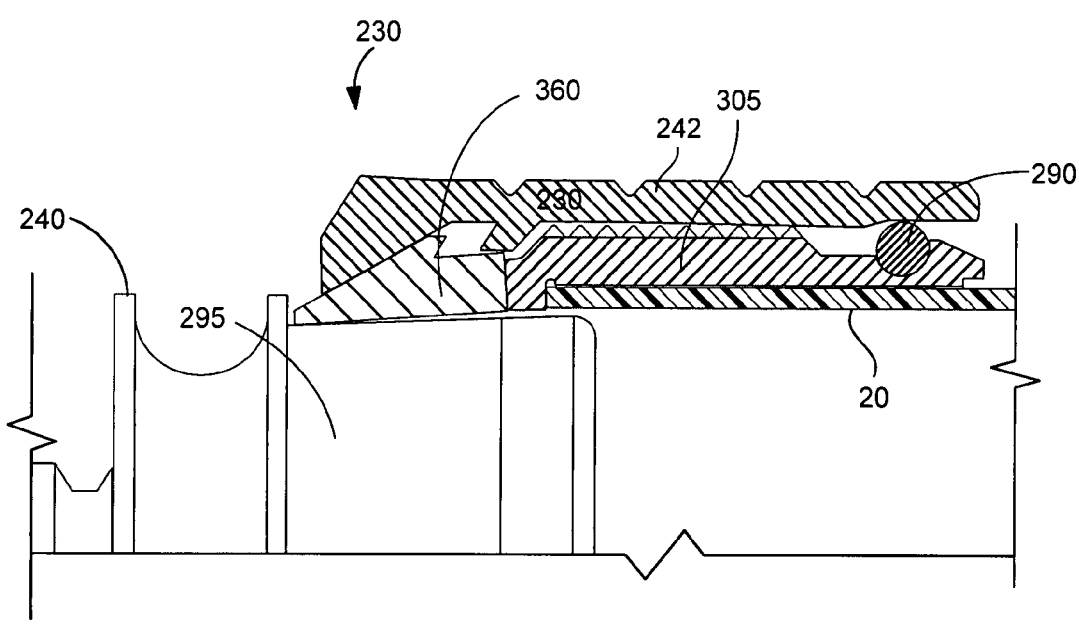
FIG. 20 is a partial cross-sectional view of a microphone mount, the first conduit section and the end piece clamping means in its closed position.

The end piece clamping mechanism for the top and bottom conduit sections utilizes the tail collet 360 illustrated in FIG. 14. The uppermost portion of the top section 295 is inwardly tapered a small amount, as illustrated in FIG. 19 as angle b. Angle b is critical and is preferably 2.5 degrees. As a result of the inward taper, the tail collet 360 must be deformed more than the collet 80 used in the middle sections of the pole. Consequently, tail collet 360 is provided with additional openings compared to collet 80 to provide for the additional deformation when the collar is tightened. The end piece clamping mechanism is shown in its "open" position in FIG. 19. When the end piece clamping mechanism is open, the lip 310 is able to be lifted from the tail collet 360 and the mounting plug 240 can readily be removed. When the end piece clamping mechanism is closed as shown in FIG. 20, the collect is deformed preferably 2.5 degrees to provide a secure lock for the mounting plug 240. The clamping mechanism are designed so that even as the parts wear, the collet will not separate from the collar which prevents resulting noise from being transmitted during operation. In the preferred embodiment, the collets and the spacer and are comprised of acetylcopolymer [Delrin] which has a "memory" in that it will to return to its original shape after being compressed. The cable is preferably a 4-conductor 28 gauge wires with 95% stranded shielding.

Figure 15:
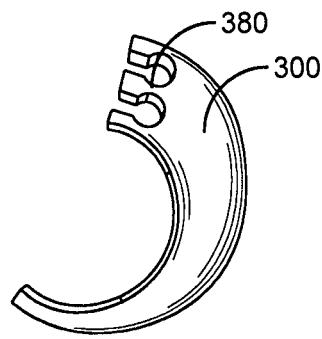
FIG. 15 is a retaining clip of the present invention.

In the preferred embodiment, a cable management device is provided by retaining clip 300 shown in FIGS. 15 and 16, which removably snaps onto one of the conduit sections. The clip 300 includes slots 380 for receiving the cable(s). The clip 300 selectively retains the conductor or cable 15 to provide management of the cables during the operation of the boom pole. There are many possible designs for the retaining clip. The retaining clips are adapted to fit on the boom pole and thus have annular center for capturing the pole. The retaining clips are formed with eccentric outer wing in a preferred embodiment. When the clips are rotated on the bottom section of the boom pole and placed between the base support of the pole and the XRL connector, additional support is provided to secure the transmitter (or any other device received by the XRL connector).

Figure 21:
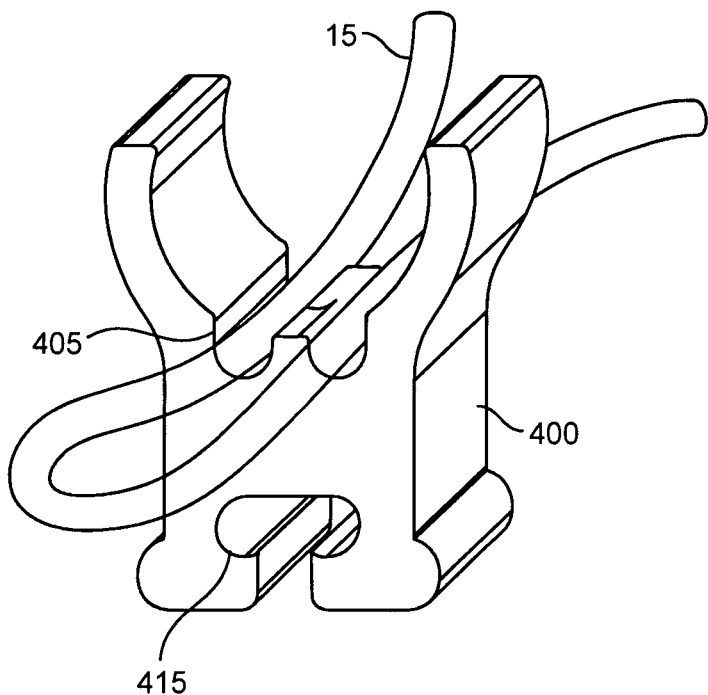
FIG. 21 is perspective view of an alternate retaining clip of the present invention.
Figure 22:
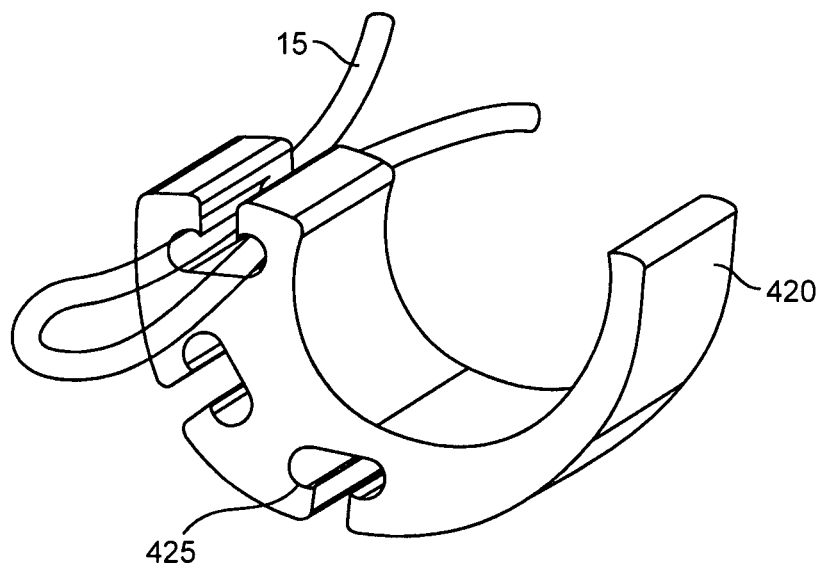
FIG. 22 is a perspective view of an another alternate retaining clip of the present invention.

Additional configurations of the retaining clip are illustrated in FIG. 21 and FIG. 22. Retaining clip 400 is shown in FIG. 21 with two different types of slots 405, which are U-shaped, and 415, which are T-shaped, for receiving and securing the cables. Retaining clip 420 is provided with T-shaped slots 425. The cable is preferably inserted into the slots prior to attaching the retaining clip to the boom pole. To insert the cables into the T-shaped slots 415 or 425 of retaining clips, the conductor should be formed into a loop, as shown in FIGS. 21 and 22. The loop is inserted sequentially; one side of the loop is inserted into the vertical portion of the "T" and then the second side of the loop. The looped cable is pulled so that each side of the loop is secured into their respective horizontal portions of the "T". The cable is thus secured so that the cables do not become loose during operation of the pole preventing vibration and consequent noise.

Figure 17:
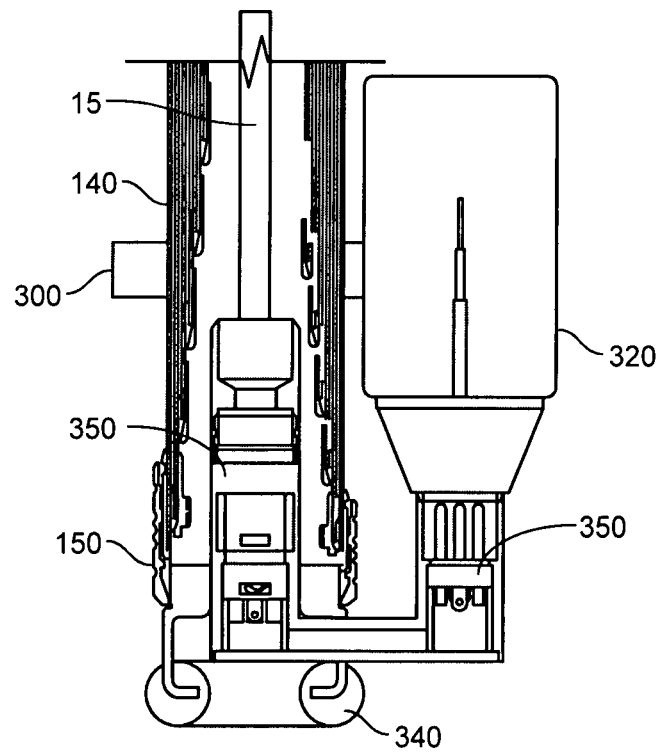
FIG. 17 is a partial cross-sectional view of the invention, illustrating a wireless transmitter base support that includes an elastomeric shock bumper.

Further, a base support 330 (FIG. 17) having an elastomeric or pliable bumper 340 is included in the preferred embodiment, in the lower-most conduit, the tail section 154 for securely supporting a wireless transmitter 320 and for reducing noise or vibration through the support 10 when the boom pole is inadvertently dropped onto the ground or is other surface.

Figure 18:
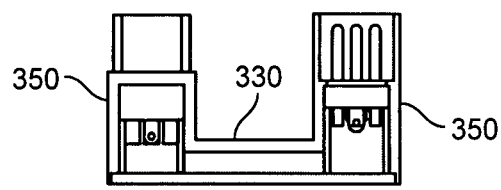
FIG. 18 is a cross-sectional view of the base support.

The base support 330 is preferably inserted into open end of the tail section 154 and may include at least one XRL-type connector 350 electrically connected to the conductor 15 for allowing a transmitter 320 to be quickly, electrically connected to the boom pole (FIG. 18). The U-shape of the base support 330 having the XRL connector provides for the transmitter 320 to be placed parallel to the boom pole in a location where it is less likely to be damaged. Preferably the base support 330 is made from a rigid material, such as metal. The bumper 340 is preferably a rubber or foam material capable of absorbing mechanical shock forces, and may be removably affixed to the support 330 with a screw, fastener, adhesive, or the like (not shown).

Figure 8:
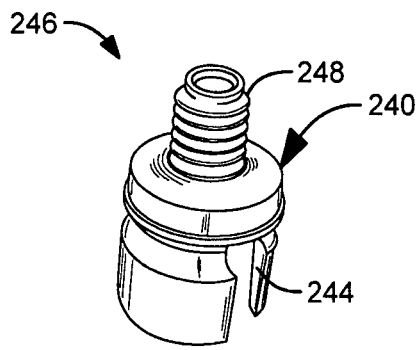
FIG. 8 is a perspective view of a mounting plug of the invention.

Preferably, the upper end 24 of the first conduit section 20 includes an end piece clamping means 230 and a mounting plug 240 (FIGS. 1 and 8). The mounting plug 240 is received in the top end 24 of the first conduit 30 and selectively fixed thereto by the additional clamping means 230. The mounting plug 240 further includes a mounting means 246 and a conductor slot 244 therein for receiving the electrical conductor 15 (FIG. 16). The mounting means 246 may be a threaded bolt 248, such as a conventional camera mounting bolt 248 (FIG. 8).

Figure 9:
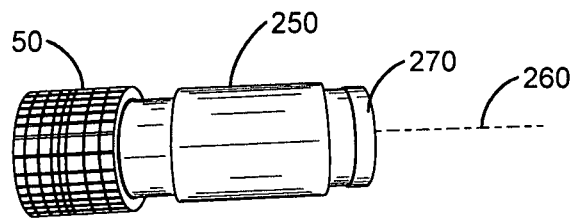
FIG. 9 is a partial front elevational view of a spacer fixed between two conduits of the invention.
Figure 10:
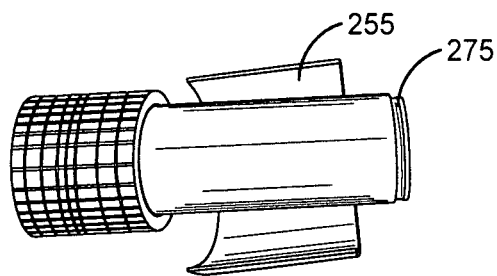
FIG. 10 is a partial rear elevational view of the spacer of the invention.
Figure 12:
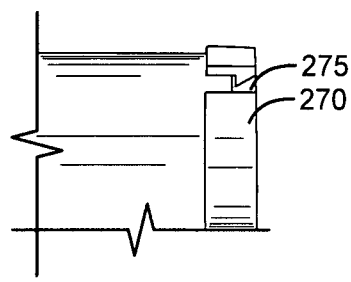
FIG. 12 is a partial elevational view of a stop washer of the invention.

The boom pole 10 may further include a spacer 250 (FIG. 9) wrapped around and fixed between conduits 20,30 and 140 for maintaining the coalignment of the longitudinal axes 260 of each of the conduits 20,30, and 140, even when in the extended orientation as shown in FIG. 1. The spacer 250 may be a sheet of durable plastic material 255 (FIG. 10), for example, wrapped around each conduit 20,30, and 140. The spacer 250 is moved against a stop washer 270 shown in FIG. 12. The stop washer 270 is preferably a discontinuous ring forming another collet which is placed around the ends (e.g. 26 and 36) of each conduit section. The spacer 250 travels against the stop washer 270 and deforms the stop washer 270 outward which provides an additional locking function. A groove 275 (FIG. 10) proximate the bottom end 26,36,146 of each conduit 20,30,140 may be included to fix the stop washer 270 in place on the conduit 20,30,140.

While a particular form of the invention has been illustrated and described, it will be apparent that various modifications can be made without departing from the spirit and scope of the invention. For example, the exact number of additional conduits 140 may be any practical number depending upon how long of a boom pole 10 is desired when the support 10 is in the extended orientation. Further, any known type of connector 350 may be used for attaching various types of electronic components, not just microphones or transmitters 320. Accordingly, it is not intended that the invention be limited, except as by the appended claims.

What is claimed is:

1. A telescoping boom pole for use with a microphone, comprising:
   a) a first cylindrical conduit having an outer wall and top and bottom open ends;
   b) a second cylindrical conduit having an outer wall, top and bottom open ends, and slidably assembled over the first conduit;
   c) clamping means comprising:
   i) an annular cylindrical collar having top and bottom open ends, a top edge and a bottom edge, a generally cylindrical inside surface, a generally cylindrical outside surface, the inside surface including a threaded portion proximate said bottom edge and a collet restraining means proximate said top edge;
   ii) an annular, compressible collet having top and bottom open ends, a generally cylindrical inside surface, and an outside surface, the collet having a lip adapted for removable engagement with said collet restraining means, the collet further including an inclined lower portion on said outside surface thereof
   iii) an annular sleeve having top and bottom open ends, a generally cylindrical inside surface, a generally cylindrical outside surface, said sleeve affixed to the top end of the second conduit, the outside surface of the sleeve including a threaded portion adapted for engagement with the threaded portion of said collar, said top edge of said sleeve formed into an upwardly-projecting wedge for urging the collet inwardly at said inclined lower portion of said collet as said collar is tightened onto said sleeve, said collet, sleeve, and collar compressing said first conduit to be immovably secured to said second conduit; and
   (iv) a substantially cylindrical spacer fixed between said first and second conduits for maintaining the co-alignment of the longitudinal axes of each of the conduits.

2. The boom pole of claim 1 further including:
additional cylindrical conduit sections slidably assembled over the first and second conduit sections; and
additional clamping means positioned between each conduit section.

3. The boom pole of claim 2 further including a bottom conduit section and base support removably affixed to the bottom conduit section.

4. The boom pole of claim 3 wherein the base support includes an elastomeric bumper.

5. The boom pole of claim 4 further including an electrical connector for receiving a transmitter removably affixed to said base support wherein the electrical connector forms a 90 degree angle with said base support.

6. The telescoping boom pole of claim 1 wherein the inside surface of the sleeve of the clamping means includes a lip proximate the top edge thereof such that the top open end thereof has a smaller diameter than that of the bottom open end thereof, and such that the top end of the second conduit abuts said lip when the sleeve is fixed to the top of the second conduit.

7. The telescoping boom pole of claim 1 wherein the inside surface of the sleeve of the clamping means further includes a channel for accepting an adhesive to affix the sleeve to the second conduit.

8. The telescoping boom pole of claim 1 wherein the conductor is enclosed by said conduits.

9. The telescoping boom pole of claim 6 wherein the top end of the first conduit includes an additional clamping means and a mounting plug, the mounting plug being received in the top end of the top conduit and selectively fixed thereto by the additional clamping means, the mounting plug further including a conductor slot therein for receiving the electrical conductor therethrough, and a mounting means.

10. The telescoping boom pole of claim 9 wherein the mounting means is a threaded bolt.

11. The telescoping boom pole of claim 9 wherein the mounting means is a conventional camera mounting bolt.

12. The telescoping boom pole of claim 1 wherein the bottom end of each conduit includes a stop washer placed between each pair of successive conduits.

13. The telescoping boom pole of claim 1 wherein an O-ring retention channel is formed into the outside surface of the sleeve of the clamping means proximate the bottom edge of the sleeve, an elastomeric O-ring being retained therein.

14. The boom pole of claim 1 further including a retaining clip for securing the conductor.

15. The boom pole of claim 14 wherein said retaining clip includes an eccentric outer wing.

16. A telescoping boom pole for, use with a microphone having a mount, comprising:
   a) a first cylindrical conduit having an outer wall and top and bottom open ends;
   b) a second cylindrical conduit having an outer wall, top and bottom open ends, and slidably assembled over the first conduit; and
   c) a clamping means comprising:
   i) an annular cylindrical collar having top and bottom open ends, a top edge and a bottom edge, a generally cylindrical inside surface, a generally cylindrical outside surface, the inside surface including a threaded portion proximate said bottom edge and a collet restraining means proximate said top edge;
   ii) an annular, compressible collet having top and bottom open ends, a generally cylindrical inside surface, and an outside surface, the collet having a lip adapted for removable engagement with said collet restraining means, the collet further including an inclined lower portion on said outside surface thereof; and
   iii) an annular sleeve having top and bottom open ends, a generally cylindrical inside surface, a generally cylindrical outside surface, said sleeve affixed to the top end of the second conduit, the outside surface of the sleeve including a threaded portion adapted for engagement with the threaded portion of said collar, said top edge of said sleeve formed into an upwardly-projecting wedge for urging the collet inwardly at said inclined lower portion of said collet as said collar is tightened onto said sleeve, said collet, sleeve, and collar compressing said first conduit to be immovably secured to said second conduit; and d) an end piece clamping means comprising:
  i) an annular cylindrical tail collar having top and bottom open ends, a generally cylindrical inside surface, a generally cylindrical outside surface, the inside surface including a threaded portion proximate said bottom end and a collet restraining means proximate said top end;
  ii) an annular, compressible tail collet having top and bottom open ends, a generally cylindrical inside surface, and an outside surface, the collet having a lip adapted for removable engagement with said collet restraining means, the collet further including an inclined lower portion on said outside surface thereof; and
  iii) an annular tail sleeve having top and bottom open ends, a generally cylindrical inside surface, a generally cylindrical outside surface, said sleeve affixed to the top end of the second conduit, the outside surface of the sleeve including a threaded portion adapted for engagement with the threaded portion of said collar, said top edge of said sleeve formed into an upwardly-projecting wedge for urging the collet inwardly at said inclined lower portion of said collet as said collar is tightened onto said sleeve, said collet, sleeve, and collar compressing said first conduit to be immovably secured to the microphone mount.

* * * * *